United States Patent
Sanwald

(10) Patent No.: US 8,231,310 B2
(45) Date of Patent: Jul. 31, 2012

(54) COATING POWDER FEEDING DEVICE

(75) Inventor: Marco Sanwald, Abtwil (CH)

(73) Assignee: ITW Gema AG, St. Gallen (CH)

( * ) Notice: Subject to any disclaimer, the term of this patent is extended or adjusted under 35 U.S.C. 154(b) by 253 days.

(21) Appl. No.: 12/523,056

(22) PCT Filed: Jan. 28, 2008

(86) PCT No.: PCT/IB2008/000185
§ 371 (c)(1), (2), (4) Date: Jul. 14, 2009

(87) PCT Pub. No.: WO2008/093202
PCT Pub. Date: Aug. 7, 2008

(65) Prior Publication Data
US 2010/0034600 A1    Feb. 11, 2010

(30) Foreign Application Priority Data
Feb. 2, 2007  (DE) .......................... 10 2007 005 313

(51) Int. Cl.
*B65G 51/36* (2006.01)
(52) U.S. Cl. .............. 406/34; 406/50; 406/90; 406/127; 406/146
(58) Field of Classification Search .............. 406/50, 406/146, 34, 90, 127
See application file for complete search history.

(56) References Cited

U.S. PATENT DOCUMENTS

| | | | | |
|---|---|---|---|---|
| 2,667,280 A * | 1/1954 | Lane et al. | ..................... | 414/805 |
| 2,946,488 A * | 7/1960 | Kraft | .............................. | 222/134 |
| 3,260,285 A * | 7/1966 | Vogt | ................................. | 141/8 |
| 3,649,081 A * | 3/1972 | Johnson et al. | ................. | 406/85 |
| 3,788,368 A * | 1/1974 | Geng et al. | ........................ | 141/67 |
| 3,918,641 A | 11/1975 | Lehmann et al. | | |
| 3,932,065 A * | 1/1976 | Ginsberg et al. | .............. | 417/317 |
| 3,994,627 A * | 11/1976 | Calzolari | ....................... | 417/317 |
| 4,405,289 A * | 9/1983 | Nakashima | .................... | 417/250 |
| 4,517,099 A * | 5/1985 | Breckner | ....................... | 210/741 |
| 4,521,165 A * | 6/1985 | Handleman | .................... | 417/393 |
| 4,611,973 A * | 9/1986 | Birdwell | ......................... | 417/342 |
| 5,131,350 A | 7/1992 | Buschor | | |
| 5,622,484 A * | 4/1997 | Taylor-McCune et al. | ... | 417/393 |
| 5,741,558 A * | 4/1998 | Otani et al. | .................... | 427/469 |

(Continued)

FOREIGN PATENT DOCUMENTS
DE           4239496 A1    5/1994
(Continued)

OTHER PUBLICATIONS

ISR and Written Opinion for PCT/IB2008/000185 dated Jun. 3, 2008.

*Primary Examiner* — Joseph A Dillon, Jr.
(74) *Attorney, Agent, or Firm* — Lowe Hauptman Ham & Berner LLP

(57) ABSTRACT

A coating powder feed unit containing a powder pump which in a suction operating mode aspirates coating powder into a powder chamber (30) and in a pressure operating mode expels coating powder by means of compressed air out of the powder chamber (30). Said unit includes a pressure tester (64) measuring the compressed air pressure and generating a test signal based on the measured compressed air pressure.

19 Claims, 3 Drawing Sheets

U.S. PATENT DOCUMENTS

Figure 1:
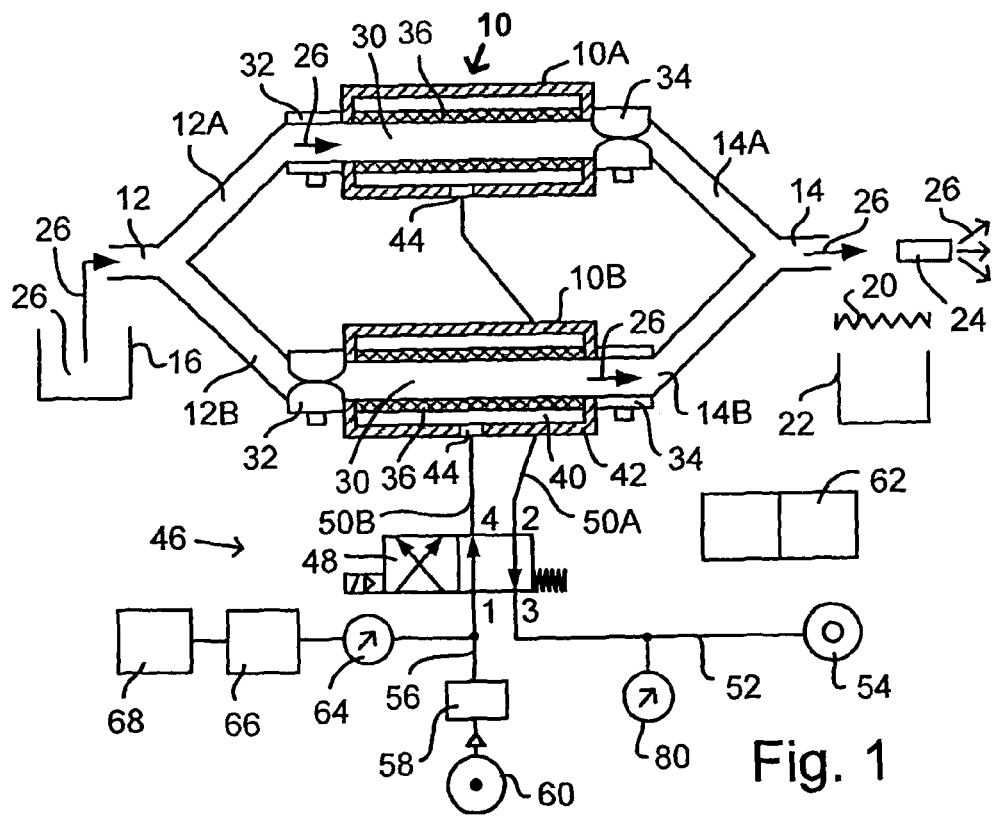

| | | | |
|---|---|---|---|
| 6,155,752 A * | 12/2000 | Buhlmann | 406/181 |
| 6,210,533 B1 * | 4/2001 | Doelle | 162/246 |
| 6,325,572 B1 | 12/2001 | Dietrich | |
| 6,368,026 B1 * | 4/2002 | Takazawa | 406/68 |
| 6,447,216 B1 * | 9/2002 | Higuchi et al. | 406/27 |
| 6,478,513 B1 * | 11/2002 | Higuchi et al. | 406/19 |
| 6,508,610 B2 * | 1/2003 | Dietrich | 406/13 |
| 6,623,215 B2 * | 9/2003 | Dietrich | 406/197 |
| 6,712,587 B2 * | 3/2004 | Gerhardt et al. | 417/390 |
| 6,929,454 B2 * | 8/2005 | Munzenmaier et al. | 417/403 |
| 6,953,315 B2 * | 10/2005 | Cartwright | 414/217 |
| 6,972,052 B2 * | 12/2005 | Krumma et al. | 118/300 |
| 7,144,213 B2 * | 12/2006 | Cartwright | 414/217 |
| 7,150,585 B2 * | 12/2006 | Kleineidam et al. | 406/50 |
| 7,163,359 B2 * | 1/2007 | Moser | 406/74 |
| 7,241,080 B2 * | 7/2007 | Klobucar et al. | 406/50 |
| 7,311,474 B1 * | 12/2007 | Ogasahara et al. | 406/143 |
| 7,311,502 B2 * | 12/2007 | Gerhardt et al. | 417/390 |
| 7,410,329 B2 * | 8/2008 | Simontacchi | 406/98 |
| 7,452,166 B2 * | 11/2008 | von Keudell et al. | 406/98 |
| 7,465,130 B2 | 12/2008 | Herre et al. | |
| 7,478,976 B2 * | 1/2009 | Kleineidam et al. | 406/50 |
| 7,481,605 B2 * | 1/2009 | Kleineidam et al. | 406/50 |
| 7,530,768 B2 * | 5/2009 | Durr et al. | 406/151 |
| 7,648,312 B2 * | 1/2010 | Kleineidam et al. | 406/50 |
| 7,712,681 B2 * | 5/2010 | Fulkerson et al. | 239/113 |
| 7,731,456 B2 * | 6/2010 | Fulkerson et al. | 406/97 |
| 2002/0129765 A1 | 9/2002 | Mauchle | |
| 2006/0093442 A1 | 5/2006 | Kleineidam | |

FOREIGN PATENT DOCUMENTS

| | | |
|---|---|---|
| DE | 19611533 A1 | 9/1997 |
| DE | 10261053 A1 | 7/2004 |
| DE | 10353968 A1 | 7/2005 |
| DE | 102004052949 A1 | 5/2006 |
| EP | 0412289 A2 | 2/1991 |
| EP | 1240947 A1 | 9/2002 |
| EP | 1566352 A2 | 8/2005 |
| JP | 7264608 A1 | 10/1995 |
| JP | 9071325 A1 | 3/1997 |
| WO | 9817558 A1 | 4/1998 |
| WO | 2005056198 A1 | 6/2005 |

* cited by examiner

COATING POWDER FEEDING DEVICE

The present invention relates to a coating powder feed device, hereafter coating powder feed unit as defined in the preamble of claim 1.

Coating powder feed units comprising at least one powder pump defined in the preamble of claim 1 are known for instance from the Japanese publication 09 071 325 A of the Japanese patent application 07 264 608; U.S. Pat. No. 6,508,610 B2 and patent document 2006/193704A1.

Powder spraycoating facilities are known for instance from the European patent document EP 0 412 289 B1; U.S. Pat. No. 3,918,641 and German patent document DE 42 39 496 A1.

The objective of the present invention is to offer a simple and economical way of ascertaining that the coating powder feed unit is operating properly.

This problem is solved by the present invention's features of claim 1.

Accordingly the present invention relates to a coating powder feed unit containing a powder pump fitted with at least one powder chamber in each case between a chamber intake valve and a chamber outlet valve and with air connection means whereby vacuum or compressed air can be alternatingly applied to the powder chamber; a pump control to drive the minimum of one powder chamber between a suction operating mode and a pressure operating mode, the powder intake valve being open in the suction operating mode while the powder outlet valve is closed and the powder chamber communicating through the air connection means with a vacuum conduit so that the vacuum allows aspirating coating powder into the powder chamber, whereas, in the pressure operating mode, the powder intake valve is closed and the power outlet valve is open and the powder chamber communicates through the air connection means with a compressed air conduit, as a result of which the compressed air is able to expel a dose of coating power from the powder chamber, characterized in that said coating powder feed unit includes a pressure tester measuring the compressed air pressure that in the pressure operating mode expels coating powder from the powder chamber, and in that the pressure tester is designed to generate a test signal depending on the measured compressed air pressure.

It is inventor's insight that the compressed air pressures in the compressed air path to the powder chamber on one hand and in the powder outlet conduit downstream of the powder chamber on the other hand are of different magnitudes depending on no coating powder at all, or a little, or much of it, being present in the powder outlet conduit. The inventor exploits this insight to generate a test signal which is a function of the compressed air pressure in one and/or the other of the said zones to serve as an indication whether the powder pump is feeding the anticipated powder rate (quantity per unit time). If such a test signal indicates that the anticipated quantity per unit time of powder is not being fed, then there is presumption either of a defect in the coating powder feed unit, or that insufficient coating powder remains in a powder container from which the powder pump draws coating powder, or cannot be removed from it, or that powder is building up downstream of the powder pump, for instance due to a kink in the powder hose.

The test signal may be visual (display of pressure) and/or illustratively it may be used for one of the following operations: generating an optical alarm signal, generating an acoustic alarm signal; generating a control signal to drive at least another component as a function of the test signal.

For the same reason and purpose, the present invention also includes the concept or configuring a vacuum tester in one or several paths of the suction air flowing from the minimum of one powder chamber to a vacuum conduit when, in a suction operating mode, the pertinent vacuum chamber must aspirate coating powder into the powder chamber. The test signal so generated may be used for the same purposes as the pressure tester described herein. Such a vacuum tester may be used in lieu of the pressure tester or in addition to it.

The dependent claims define further features of the present invention.

The present invention is elucidated below by the description of preferred, illustrative embodiment modes and in relation to the appended drawings.

Figure 2:
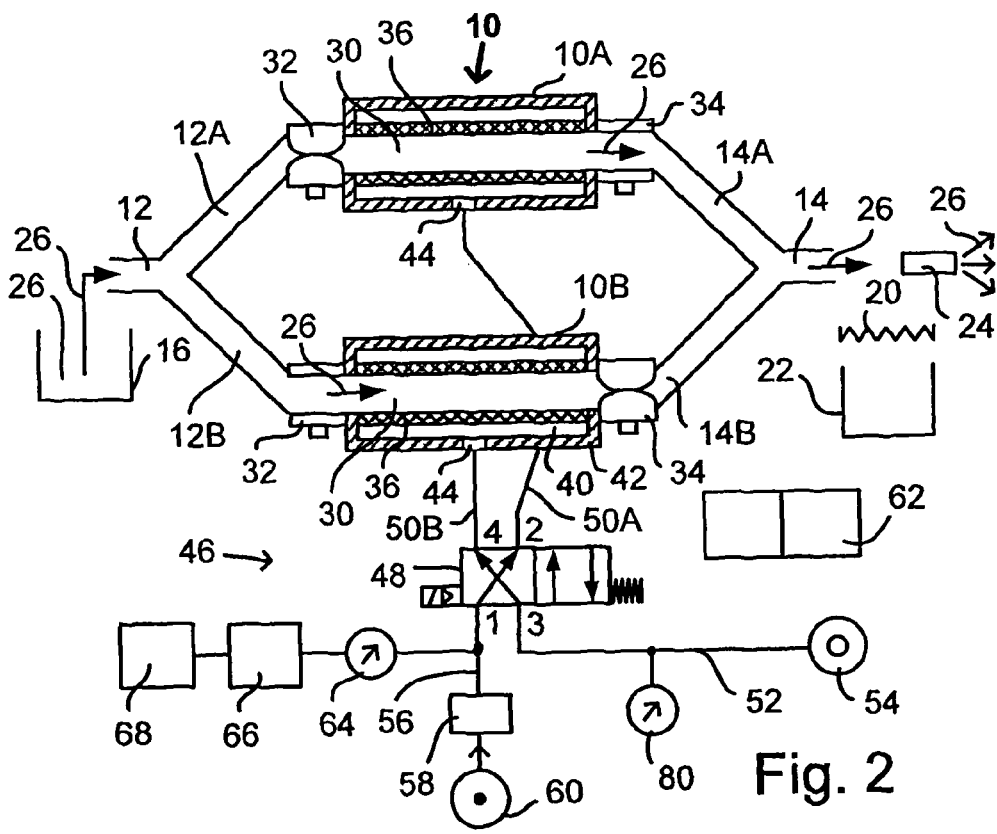
Figure 3:
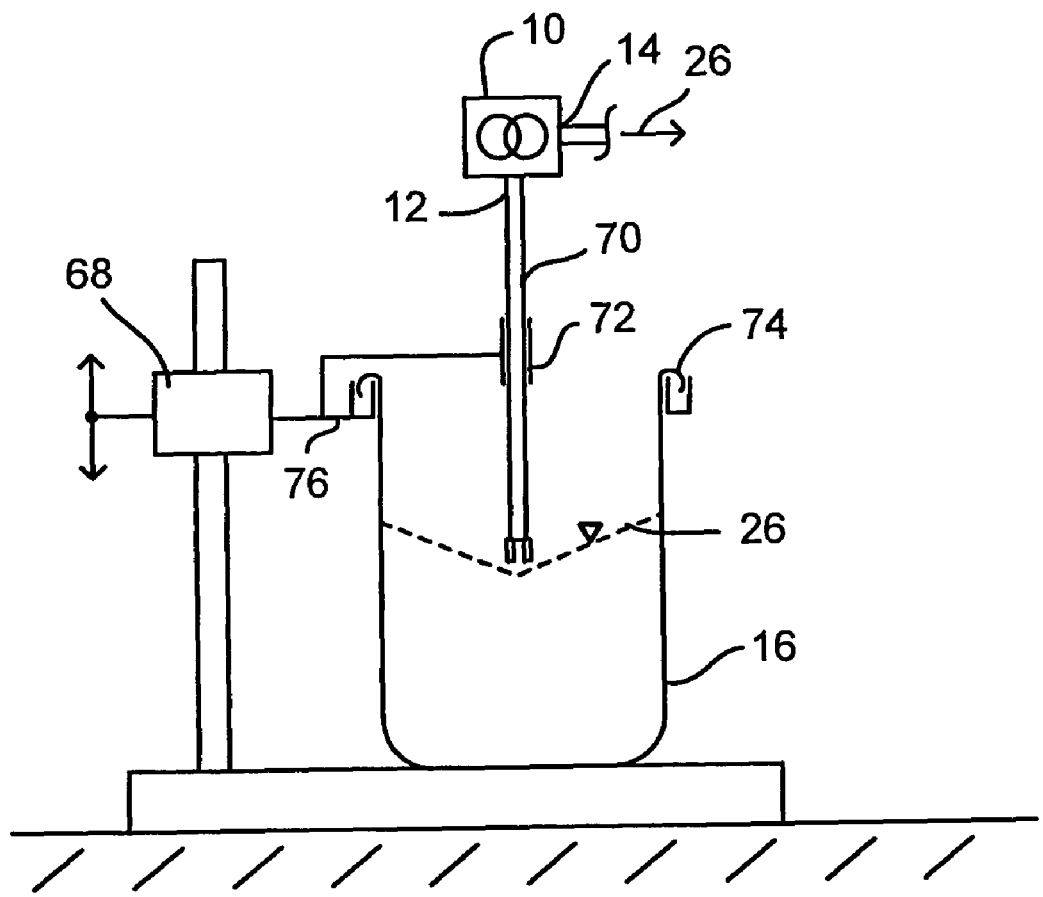
Figure 4:
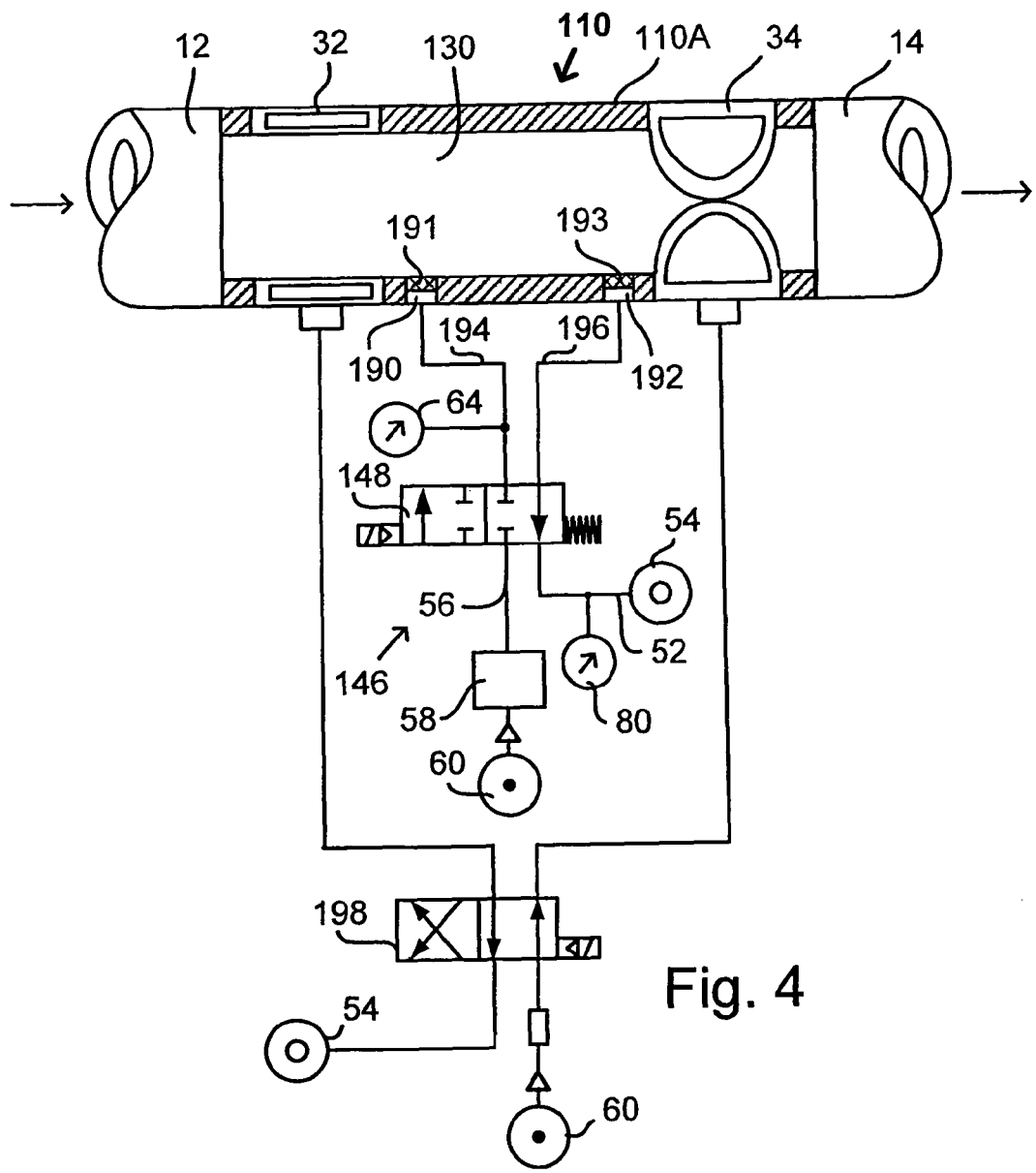
Figure 5:
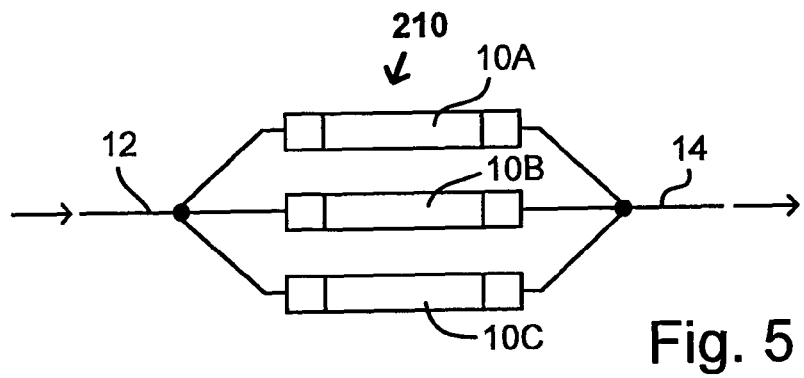

FIG. 1 schematically shows in partly axial section a powder coating feed unit of the invention, comprising a powder pump containing two pump elements one of which is shown in the suction operating mode and the other in the pressure operating mode, FIG. 2 shows the coating powder feed unit of FIG. 1. one pump being shown in a pressure operating mode and the other in a suction operational mode, FIG. 3 shows in partly vertical section further components of a powder spraycoating facility which may be operated in combination with the powder coating feed unit of the present invention, FIG. 4 schematically shows in partial lengthwise section a further embodiment mode of a powder coating feed unit of the present invention, and FIG. 5 schematically shows a powder pump of the present invention containing three pump elements.

The coating powder feed unit of the invention may be a single chamber powder pump, a double chamber powder pump, a three-chamber powder pump or another multi-chamber powder pump. Each chamber is designed as a pump element. When the powder pump contains more than one chamber, the pump outlets are combined into one common powder outlet conduit. The pump intakes may be connected to individual powder sources or preferably to a single powder intake conduit.

FIGS. 1 and 2 schematically show a coating powder feed unit within a powder spraycoating facility, said coating powder feed unit containing a powder pump 10 fitted with two chambers or pump elements 10A and 10B. The two pump elements 10A and 10B are identical and therefore the description of one also is a description of the other. A powder intake conduit 12 is connected to the two powder intakes 12A respectively 12B of the two pump elements 10A and 10B. A powder outlet conduit 14 is connected flow-wise to the powder outputs 14A and 14B of the two pump elements 10A and 10B. The powder intake conduit 12 may be a conduit connector which can be connected to a powder conduit to aspirate coating powder out of a powder container 16 or it may extend per se as far as this container.

The powder outlet conduit 14 may run as far as a powder receiving means or be designed as a conduit connector element which can be hooked up to a powder conduit running to a powder receiving means. The powder receiving means illustratively may be a sieve 20, an intermediate powder receptacle 22 or a spray means 24 to spray coating powder 26 onto an object to be coated.

The two pump elements 10A and 10B may be separate components or they may be integrated into a single one.

Each pump element 10A and 10B contains a powder chamber 30 each between a power intake valve 32 at one chamber end and a powder outlet valve 34 at an opposite chamber end. The powder intake valves 32 each are situated between the powder chamber 30 and the powder intake 12A respectively 12B. The powder outlet valves 34 each are situated between the powder chamber 30 and the powder outlet 14A respectively 14B.

The peripheral wall of the powder chamber 30 in each case is constituted by a tubular filter 36 which extends at least over part, preferably over the full length, of the powder chamber 30 between its two valves 32 and 34 and which is permeable to air but impermeable to coating powder. Illustratively the filter 36 is made of a dimensionally stable, open-pore material. The filter 36 is enclosed over its full length by an air chamber 40 and separates it from the powder chamber 30. The air chamber 40 moreover is bounded by a housing 42 fitted with an air connection aperture 44.

The powder intake valves 32 and the powder outlet valves 34 are controlled valves, preferably pinch valves.

The powder intake and powder outlet valves 32 and 34 and the air connection aperture 44 are connected to a pump control 46 driving the pump elements 10A and 10B between a suction operating mode and a pressure operating mode. The powder intake valve 32 is open in the suction operating mode while the powder outlet valve 34 is closed, the powder chamber 30 communicating through the air connection aperture 44 with a vacuum conduit 52, whereby the vacuum can aspirate coating powder 26 into the powder chamber 30 of either pump element 10A and 10B. In the pressure operating mode, the powder intake valve 32 is closed and the powder outlet valve 34 is open and the powder chamber 30 communicates through the air connection aperture 44 with a compressed air conduit 56 whereby coating powder may be expelled by compressed air out of the powder chamber 30 of the pertinent pump element 10A respectively 10B into the powder outlet conduit 14.

The pump control 46 drives the two pump elements 10A and 10B in a manner that one of them operates in the suction operating mode while the other operates in the pressure operating mode and thereupon aid other pump element operates in the suction operating mode, and then again reversely. FIG. 1 shows the operating state wherein the pump element 10A is in the suction operating mode and simultaneously the other pump element 10B in the pressure operating mode. FIG. 2 shows the next operational mode wherein the pump element 10A operates in the pressure mode and the other pump element 10B in the suction mode.

Instead of being fitted with a single air connection aperture 44 for compressed air and vacuum, each pump element 10A and 10B also might be fitted with two apertures, one of them being the compressed air feed aperture and the other a vacuum hookup aperture.

According to the preferred embodiment mode of the invention and as shown in FIGS. 1 and 2, only a single air connection aperture 44 is provided for each pump element 10A and 10B. Illustratively the pump control 46 comprises a reversible control valve 48 such as a 4/2 way valve. A valve air connection 2 of the control valve 48 communicates through an air conduit 50A with the air connection aperture 44 of the pump element 10A. Another valve connector 4 of the control valve 48 communicates through a first air conduit 50B with the air connection aperture 44 of the other pump element 10B. The vacuum conduit 52 is connected to a vacuum connection 3 of the control valve 48 and communicates with, or can be connected to, a vacuum source or to a further vacuum conduit 54. The compressed air conduit 56 is connected to a compressed air connection 1 of the control valve 48 and also is connected to or connectable with—by means of a minimum of one further component such as a valve or a pressure regulator 58—a compressed air source or a further compressed air conduit 60.

The pump control 46 furthermore may comprise a diagrammatically shown control valve 62 driving the pump intake valves 32 and the powder outlet valves 34.

The invention includes a pressure tester 64 to measure the compressed air pressure whereby, in the pump pressure operating mode, coating powder 26 is expelled from the powder chamber 30 of the first pump element 10A or of the other pump element 10B through the powder outlet aperture 34. The pressure tester 64 is designed to generate a test signal as a function of the measured compressed air pressure.

According to the preferred embodiment mode of FIGS. 1 and 2, the tester 64, for instance a manometer or a pressure tester, is connected upstream of the control valve 48 to the compressed air conduit 56. It measures thereby the compressed air pressure both for the pump element 10A and the other pump element 10B. This pressure corresponds to the compressed air pressure—less the pressure drop across the filter 36—by which said compressed air expels coating powder from the powder chamber 30 of the pertinent pump element 10A or 10B through the powder outlet valve 34 and out of said chamber. The pressure measured by the pressure tester 64 identically corresponds also to that pressure prevailing during the pressure operating mode in the air chamber 40 of the pertinent pump element 10A or 10B.

Consequently the pressure tester 64 instead of being connected to the compressed air conduit 56 might also be connected to the air chamber 40. There is furthermore the possibility to connect such a pressure tester 64 to the powder chamber 30 or to the powder chamber 30 or to the powder outlet of the pump elements 10A and 10B of to the output conduit 14 in order to measure the pressure therein. However measuring the air pressure at the powder side of the filter 36 would entail the drawback that powder particles might adhere at the site of measurement and render the test results spurious.

Preferably the pressure tester 64 is designed to optically display the compressed air magnitude it measures. In this manner an operator may visually determine whether the coating powder feed facility, in particular the powder pump 10, is working properly or whether the displayed pressure value is different from the value required for proper operation.

Instead or additionally, the pressure tester 64 also may be designed to generate an acoustic or electrical alarm signal which shall be generated when the measured compressed air pressure deviates from a predetermined value or range of values.

In another embodiment mode of the invention, the pressure tester 64 is connected to equipment 66 designed to generate at least one of the following signals as a function of a test signal from the pressure tester 64: generating an optical signal, an acoustic signal, a control signal driving at least one other device 68 as a function of the tester and/or a shutoff signal to shut off the coating powder feed unit or the entire powder spraycoating facility.

The said other device 68 driven as a function of pressure tester signals illustratively may be a height adjusting device (raising device) to adjust the height of a powder feed pipe 70 to which the powder pump 10 is affixed or connected flowwise to feed coating powder 25 from a powder container 16 into which the powder feed pipe can be dipped.

FIG. 3 shows a powder container 16 in the form of a powder bag 16 holding coating powder 26. The powder pump 10 or another pump is mounted on the upper end of the powder feed pipe 70. This powder feed pipe 70 runs through a vertical guide 72 and is freely displaceable relative to the guide 72, and as a result said pipe 70 by gravity can follow downward the level of the coating powder 26 in the powder container 16. The opening rim 74 of the powder bag 16 is kept open by a rim frame 76 affixed to a displaceable element 68 and displacing said frame as it moves. Illustratively the displaceable element 68 may be driven by the device 66. The rim support 76 can be lowered as a function of the test signal of the pressure tester 64 as a function of signal from pressure tester 64 in order that powder within the bag shall slide downward and reach again the suction zone at the lower end of the powder feed pipe 70 when, due to aspirating coating powder from the powder bag 16, a powder funnel has been created as diagrammatically shown in FIG. 3.

In lieu of a pressure tester 64 or in addition to it, a vacuum tester 80 (vacuum measuring element) may be used which, as illustratively shown in FIGS. 1 and 2, tests the reduced pressure of said partial vacuum whereby coating powder is aspirated during the suction operating mode into the powder chamber 30, namely, in FIG. 1, into the pump element 10A and in FIG. 2 into the pump element 10B. The magnitude of the reduced pressure, i.e. partial vacuum, depends on the magnitude of flow impedance in the powder intake conduit 12 and furthermore also on the presence or absence of powder or for instance on said powder intake conduit being clogged or not. The reduced pressure (vacuum) can be displayed by the reduced pressure tester 80. Moreover the reduced pressure tester 80 is able to generate a signal which is a function of the measured reduced pressure for the above-described operations also for the pressure tester 64 used for the compressed air.

FIG. 4 shows a powder pump 110 comprising for instance one pump element 110A (or two or more pump elements 110A, 110B etc.) and a pump control 146. This design differs from the embodiment mode of FIGS. 1 and 2 in that the powder chamber 130 is devoid of a common air connection 44 for compressed air and vacuum, instead a compressed air connection aperture 190 is configured adjacent to the powder intake valve 32 and a vacuum connection aperture 192 is adjacent to the powder outlet valve 34. Preferably these two apertures 191 respectively 193 are each separated from the powder chamber 130, the filter element being permeable to air while impermeable to coating powder. The compressed air connection aperture 190 communicates through a compressed air connection conduit 194 with a control valve 148 and through same can be connected to a compressed air conduit 56. In this instance the pressure tester 64 may be connected in the manner shown in FIGS. 1 and 2 to the compressed air conduit 56 or in the manner shown in FIG. 4 to the compressed air connecting conduit 194.

The vacuum connection aperture 192 communicates through a vacuum connection conduit 196 also with the control valve 148 and may communicate by means of a vacuum conduit 52 with another vacuum conduit 54 or with a vacuum source.

FIG. 4 shows components corresponding to those of FIGS. 1 and 2 being denoted by the same references, whence not needing to be discussed again. The pressure tester 64 in FIG. 4 may be configured upstream or downstream of the control valve 148.

FIG. 4 also shows a reversing valve 198 to alternatingly open and close the powder intake valve 32 and the powder outlet valve 34.

FIG. 5 schematically shows a powder pump 210 fitted with three (or more) identical pump elements 10A and 10B of FIGS. 1 and 2 and a pump 10C. The pump elements 10A, 10B and 10C are driven by the pump control (46 of FIG. 1) in a manner that the compression and suction operating modes of the three pump elements are superposed one on the other to implement a constant timing corresponding to the number of pumps, whereby at least one pump element shall be in a compression, and simultaneously another pump element in a suction, operating mode at any time and all three pump elements together generate an uninterrupted flow of powder into the powder outlet conduit 14.

The invention claimed is:

1. A coating powder feed unit, comprising:
a powder pump fitted with at least two alternating powder chambers between a powder intake valve and a powder outlet valve, each of said power chambers having a tubular filter centrally disposed therethrough,
an air connection apparatus for alternatingly applying a vacuum or compressed air to either one of the at least two alternating powder chambers,
a pump control to switch either one of the two alternating powder chambers between suction and pressure operating modes,
wherein the powder intake valve is open and the powder outlet valve is closed and one of the at least two powder chambers communicates through the air connection apparatus with a vacuum conduit whereby the vacuum is able to aspirate coating powder into the powder chamber in a suction operating mode,
wherein the powder intake valve is closed and the powder outlet valve is open and one of the powder chambers communicates through the air connection apparatus with a compressed air conduit so that the compressed air is able to expel a dose of coating powder stored in the powder chamber in a pressure operating mode, and
wherein said coating powder feed unit includes a pressure tester in fluid communication with each one of the at least two powder chambers continuously, and wherein said pressure tester generates a test signal as a function of measured compressed air pressure in said pressure operating mode.

2. The coating powder feed unit of claim 1, wherein said annular filter is configured between the at least two alternating powder chambers the air connection apparatus and is permeable to air but impermeable to coating powder and in that the pressure tester is connected to a compressed air path running from the compressed air conduit through the air connection apparatus to the air side of the filter, the filter separating the air side from the powder chamber.

3. The coating powder feed unit of claim 1, wherein said tubular filter is positioned within the peripheral wall of the powder chamber at least over part of said chamber's length between the powder intake valve and the powder outlet valve and separating the powder chamber from an air chamber enclosing the filter at its external periphery, the filter being permeable to air but impermeable to coating powder, and in that the air connection apparatus are subtended in a pump element housing and communicate flow-wise with the air chamber.

4. The coating powder feed unit of claim 3, wherein the air connection apparatus within one of the at least two alternating powder chambers each comprises an air connection aperture, in that the pump control comprises a valve circuit, in that the air connection aperture of the pertinent powder chamber communicates in each case with a valve air connection of a valve of the valve circuit, in that the valve comprises a valve pressure connector connected or connectable to the compressed air conduit and a valve vacuum connector connected or connectable to the vacuum conduit and in that the valve is reversible in order to alternatingly connect the valve pressure connector or the valve vacuum connector to the valve air connection.

5. The coating powder feed unit of claim 3, wherein the pressure tester is connected to the compressed air path which extends from the compressed air conduit as far as into the air chamber.

6. The coating powder feed unit of claim 1, wherein the air connection apparatus within one of the at least two alternating powder chambers each comprises one compressed air connection fitted with a compressed air intake aperture into the powder chamber at or near the chamber end where the powder intake valve is situated, further a vacuum hookup fitted with a vacuum aperture into the powder chamber to aspirate air out of the powder chamber at or near the chamber end where the powder outlet valve is situated.

7. The coating powder feed unit of claim 6, wherein the pressure tester is connected to a compressed air path which runs from the compressed air conduit through a valve circuit of the pump control and then through the compressed air connection of the powder pump into the powder chamber.

8. The coating powder feed unit of claim 6, wherein the compressed air intake aperture of the compressed air connection and the vacuum aperture of the vacuum hookup of the powder pump contain a filter permeable to air but impermeable to coating powder.

9. The coating powder feed unit of claim 7, wherein the compressed air connection aperture of the powder pump comprises a filter permeable to air but impermeable to coating powder and in that the tester is connected upstream of the filter to the compressed air path.

10. The coating powder feed unit of claim 1, wherein the powder pump comprises at least three of said powder chambers each fitted with one powder intake valve, one powder outlet valve and with air connection apparatus which are connected to the pump control, in that the powder assembly control driving the powder chambers are designed in a manner that the suction modes and the pressure modes of the powder chamber are mutually overlapping whereby at all times of operation, at least one powder chamber is in a pressure mode and at least another powder chamber is in the suction mode and all powder chambers jointly generate a continuous flow of powder in a powder outlet conduit connected to the outlet sides of all powder outlet valves.

11. The coating powder feed unit of claim 1, further comprising a powder intake conduit connecting flow-wise all the intake sides of the powder intake valves of all the powder chambers.

12. The coating powder feed unit of claim 1, wherein the pressure tester is designed to generate at least one of the following test signals: an optical, acoustic, electrical, pneumatic and/or hydraulic test signal.

13. The coating powder feed unit of claim 1, wherein a device designed to generate at least one of the following operational modes based on the test signals from the pressure tester is connected to this tester: generating an optical signal, an acoustic signal, a control signal driving at least one other device as a function of the test signal and/or to generate a turn OFF signal to shut down the coating powder feed unit or a powder spraycoating facility.

14. The coating powder feed unit of claim 1, further comprising a reduced-pressure tester to measure reduced pressure prevailing during the suction operating mode in the particular powder chamber and in that the reduced-pressure tester is designed to generate a test signal as a function of the tested reduced pressure or vacuum.

15. The coating powder feed unit of claim 4, wherein the pressure tester is connected upstream of the valve to the compressed air conduit.

16. The coating powder feed unit of claim 13, wherein the at least one other device comprises a height adjusting device to adjust the height of a powder feed pipe to which the powder pump is affixed or connected flow-wise to feed powder from a powder container into which the powder feed pipe can be dipped.

17. The coating powder feed unit of claim 1, wherein the pressure tester optically displays the measured compressed air magnitude.

18. The coating powder feed unit of claim 1, wherein the pressure tester generates an acoustic or electrical alarm signal when the measured compressed air pressure deviates from a predetermined value or range of values.

19. The coating powder feed unit of claim 1, wherein the test signal of the pressure tester is used to monitor and adjust powder supply or feed.

\* \* \* \* \*